H. W. GOULD.

Repairing Pavement.

No. 6,272. Reissued Feb. 2, 1875.

WITNESSES

W. T. Newman.

R. M. Barr.

INVENTOR

Henry W. Gould.

By Lemuel W. Serrell, Attorneys.

THE GRAPHIC CO. PHOTO-LITH. 38 & 41 PARK PLACE, N.Y.

UNITED STATES PATENT OFFICE

HENRY W. GOULD, OF CLEVELAND, OHIO.

IMPROVEMENT IN REPAIRING PAVEMENTS.

Specification forming part of Letters Patent No. 146,447, dated January 13, 1874; reissue No. 6,272, dated February 2, 1875; application filed January 15, 1875.

*To all whom it may concern:*

Be it known that I, HENRY W. GOULD, of Cleveland, county of Cuyahoga, State of Ohio, have invented new and useful Improvements in Roadways; and I do hereby declare the following to be such a full, clear, and exact description thereof as will enable others skilled in the art to which it pertains to make and use it, reference being had to the accompanying drawing, which forms a part of this specification.

Figure 1:
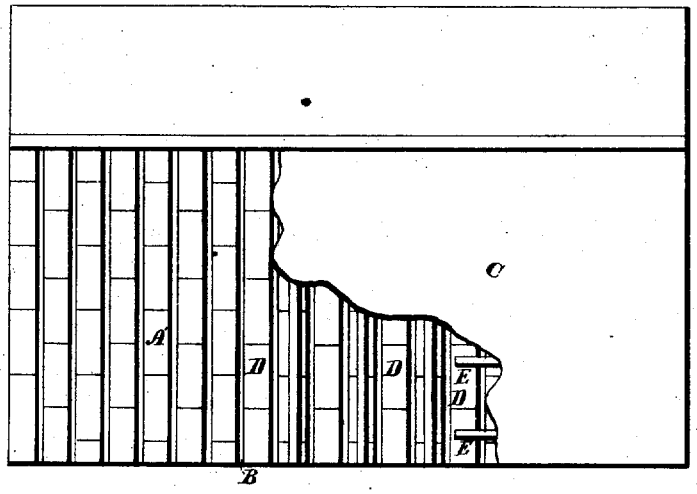
Figure 2:
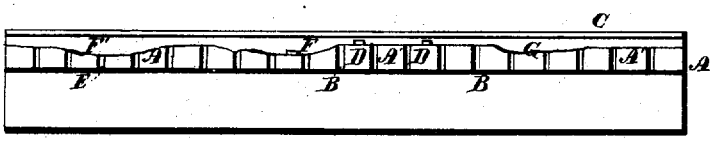
Figure 3:
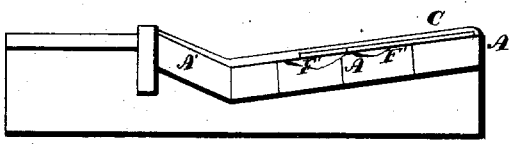

Figure 1 is a plan view of the roadway. Fig. 2 is a longitudinal section. Fig. 3 is a cross-section through the gutter.

Like letters of reference refer to like parts in the several figures.

The object of my invention is, first, to repair wood pavements that have become worn out, or that have decayed in various places, so as to cause the roadway to be rough and uneven; second, to construct a pavement that shall have a foundation of wooden blocks and a tread or superstructure of concrete, or asphaltum, sand, and gravel, with or without lime, and hydraulic cement.

In describing my invention, A is the substructure, composed of blocks A′, arranged in any suitable manner upon a foundation or road-bed. B are the spaces between the blocks. C is the coating of concrete, or asphaltum, sand, gravel, hydraulic cement, &c. D are strips of wood, that may be nailed or otherwise secured in deep ruts. E E are similar strips, extending longitudinally of the roadway. At F F F′ G are indicated ruts that may have worn in the pavement, or that may have been formed by decay, whereby the roadway is rendered rough and uneven.

I put the asphaltum coating, or the concrete coating, formed of others of the ingredients named, over the roadway, when in a fluid or plastic condition, until the upper surface is smooth and even, the ingredients having been previously mixed together in such proportions that when they become cold they will form a hard tread, suitable for the superstructure of a roadway.

If the ruts are small, as shown at G or F′ in Fig. 2, the concrete may be spread over them in such a manner as to fill up the ruts and form an even coating. If, however, the ruts are very deep, they may be partially filled by strips D, which may be secured to the blocks in any suitable manner.

In this manner old wooden roadways that have become worn out or decayed can be utilized as the substructure of a superstructure of concrete or cement, and the whole will form an elastic roadway of great durability and of cheap construction.

In describing the second part of my invention, the same invention may be applied in the construction of new roadways, and a foundation of block, A′, may be formed, and the whole covered with a coating or superstructure of asphaltum or cement, C.

What I claim as my invention, and desire to secure by Letters Patent, is—

1. In combination with the worn-out or uneven superstructure A of a wood pavement, the coating C, substantially as and for the purpose described.

2. In combination with the worn-out or uneven pavement A and superstructure C, the strips D E, substantially as and for the purpose described.

In testimony whereof I hereunto set my hand this 2d day of January, 1875.

HENRY W. GOULD.

Witnesses:

M. D. LEGGETT,

F. A. TOURNY.